United States Patent
Corbe et al.

(10) Patent No.: US 11,255,956 B2
(45) Date of Patent: Feb. 22, 2022

(54) METHOD FOR MEASURING THE FLOW VELOCITY OF A MEDIUM

(71) Applicant: VEGA GRIESHABER KG, Wolfach (DE)

(72) Inventors: Bernhard Corbe, Schutterwald (DE); Roland Welle, Hausach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 280 days.

(21) Appl. No.: 16/418,511

(22) Filed: May 21, 2019

(65) Prior Publication Data

US 2019/0369227 A1    Dec. 5, 2019

(30) Foreign Application Priority Data

May 30, 2018 (EP) .................................... 18175199

(51) Int. Cl.
*G01S 13/58* (2006.01)
*G01F 23/284* (2006.01)
(Continued)

(52) U.S. Cl.
CPC .......... *G01S 13/583* (2013.01); *G01F 23/284* (2013.01); *G01S 7/352* (2013.01); *G01S 13/88* (2013.01); *G01S 7/356* (2021.05)

(58) Field of Classification Search
CPC ........ G01S 13/583; G01S 7/352; G01S 13/88; G01S 2007/356; G01S 2007/2883;
(Continued)

(56) References Cited

U.S. PATENT DOCUMENTS 7,861,600 B2 *  1/2011  Mayer .................. G01F 23/284
                                                      73/861
9,551,606 B2 *  1/2017  Fehrenbach ............ G01F 1/002
(Continued)

FOREIGN PATENT DOCUMENTS

CN       104280065 A    7/2014
CN       104280082 A    7/2014
(Continued)

OTHER PUBLICATIONS

Search report from the EPO for related European application 19157977.0, dated Nov. 7, 2019.
(Continued)

*Primary Examiner* — Olumide Ajibade Akonai
(74) *Attorney, Agent, or Firm* — William Gray Mitchell

(57) ABSTRACT

Method for measuring the flow velocity of a medium in an open channel with a radar meter, wherein a primary emission direction of the radar meter forms with a direction of a surface of the medium a first angle from 20° to 80° and with a flow direction of the medium a second angle between 0° and 80°, comprising the following steps:
  Sending a transmission signal with a plurality of frequency ramps,
  Receiving a reception signal per frequency ramp of the transmission signal,
  Saving the reception signals,
  Performing a first spectral analysis of the reception signals,
  Performing a second spectral analysis of several receiving signals or output signals of the first spectral analysis,
  Determining a flow velocity based on the phase change yielded from the output signals of the second spectral analysis in at least one distance in the distance range.

10 Claims, 4 Drawing Sheets

(51) Int. Cl.
*G01S 7/35* (2006.01)
*G01S 13/88* (2006.01)

(58) Field of Classification Search
CPC ........ G01S 13/343; G01S 7/288; G01S 7/292; G01F 23/284; G01F 1/74; G01F 1/663; G01F 1/66; G01F 23/28; G01F 23/0061; G01F 23/268; G01P 5/00
See application file for complete search history.

(56) References Cited

U.S. PATENT DOCUMENTS

| | | | |
|---|---|---|---|
| 9,945,709 B2* | 4/2018 | Fehrenbach | ............... G01P 5/00 |
| 10,571,319 B2* | 2/2020 | Foo | ........................ G01F 1/663 |
| 2011/0000311 A1* | 1/2011 | Petroff | ................... G01F 1/662 |
| | | | 73/861.28 |
| 2015/0007654 A1* | 1/2015 | Fehrenbach | ............... G01P 5/00 |
| | | | 73/198 |
| 2015/0007655 A1* | 1/2015 | Skowaisa | .............. G01F 23/284 |
| | | | 73/198 |
| 2017/0131385 A1 | 5/2017 | Kurono | |
| 2017/0176236 A1* | 6/2017 | Corbe | ................... G01F 23/284 |

FOREIGN PATENT DOCUMENTS

| | | |
|---|---|---|
| CN | 107027323 A | 4/2015 |
| DE | 10 2011 075 826 A1 | 11/2012 |
| DE | 102013200951 A1 | 1/2013 |
| DE | 102013200951 A1 | 7/2014 |
| DE | 102016100217 A1 | 1/2016 |
| DE | 102016100217 A1 | 6/2017 |
| EP | 2 803 951 A1 | 11/2014 |
| EP | 2824427 A1 | 1/2015 |
| EP | 2 837 950 A1 | 2/2015 |

OTHER PUBLICATIONS

Search report from the EPO for parallel European application 18 17 5199, dated Dec. 12, 2018.
Office Action from the CIPO for related Chinese application 20190444474.8, dated Sep. 1, 2021.

* cited by examiner

METHOD FOR MEASURING THE FLOW VELOCITY OF A MEDIUM

CROSS REFERENCE TO RELATED APPLICATIONS

This patent application claims priority to European Patent Application 18 175 199.1, filed on May 30, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method for measuring the flow velocity of a medium.

Background of the Invention

In the field of monitoring the rivers and gullies, in addition to the level, here the flow rate is also an important variable. A volume flow flowing in this channel can be calculated from these measured variables and the known geometry of the channel. This value is of great importance, for example, in sewage treatment plants or for flood protection.

For complex channel geometries and river beds, simulations must be employed for volume flow calculation, which, according to today's state of art, is no longer a major challenge. Here it is sufficient when the flow rate is known at least at one point in the cross section of the channel. Using radar-based flow velocity sensors, it is possible to measure the surface speed at a point of the channel and to calculate the volume flow using this value.

The known radar sensors use a method for measuring the flow velocity of a medium in open channels by utilizing the so-called Doppler effect, through which a frequency shift develops by reflected radar signals which is proportional to the speed of the reflector. By determining this frequency shift, the flow rate of the medium can thus be determined.

For example, uneven surfaces of the medium or, in case of a fluid, solid particles at the surface of the fluid act as reflectors.

FIG. 1 shows a simplified illustration of a radar meter 100 for determining a flow velocity v and a level of a medium 101 in an open channel 104 according to the prior art.

The measurement of the flow velocity v of medium 101, in which the present exemplary embodiment involves a fluid, e.g. water, and a first distance d1 between a surface of the medium 101 and the radar meter 100 are combined in a single field device, for example a FMCW radar system (FMCW=Frequency Modulated Continuous Wave). The radar meter 100 can, as in the present exemplary embodiment, comprise two radar sensors: a first radar sensor 201 with a first main emission direction H1, which is aligned perpendicular to the surface of the medium 101, designed to determine the first distance d1, and a second radar sensor 202 with a second main emission direction H2, aligned diagonally in reference to the direction of flow F of the medium 101, to determine flow velocity v.

Alternatively, the radar meter 100 can comprise only the second radar sensor 202, with the help of which then both the first distance d1 of the radar meter 100 is determined in reference to the surface of the medium 101 as well as the flow velocity v. The first distance d1, which represents the distance of the radar meter 100 to the surface of the medium 101, is calculated in this second case via the determination of a second distance d2 between the surface of the medium 101 and the second radar sensor 202 in the main emission direction H2 of the second radar sensor 201 as well as a first angle α, which is formed by the second main radiation direction H2 and a surface standard on the surface of the medium 101.

For simplification, an angle can be assumed as the first angle α, which is formed by the second main direction of emission H2 and a vertical line.

The radar meter 100 according to FIG. 1 is designed in such a way that a first transmission signal 102 of the first radar sensor 201 is transmitted in the first main direction of emission H1, which is aligned perpendicular to the surface of the medium 101. The first distance d1 of the radar meter 100 from the surface of the meter 101 can be determined via a travel time of the first transmission signal 102 or a frequency shift of a received signal relative to the first transmission signal 102.

The second radar sensor 202 is arranged and designed in such a way that the second main direction of emission H2 at which the second transmission signal 103 of the second radar sensor 202 is emitted, forms the first angle α with the surface normal in flow direction F, which theoretically only needs to be less than 90° and in practice ranges from 30° to 60°. In a top view, the second main direction of emission H2 can form a second angle θ with the flow direction F of the medium 101, ranging from 0° to 60°. In the following, this orientation is also referred to as oblique.

Oblique in the sense of the present application means that the second main direction of emission H2 and the flow direction F of the medium 101 are aligned in a lateral view neither vertically in reference to each other nor parallel, i.e., the second main direction of emission H2 differs between 30° and 60° from a surface normal to the surface of the medium and between 0° and 60° from the flow direction of the medium.

The second transmission signal 103 is then reflected at least partially on the surface of the medium 101. Since the surface of the medium 101 can have slight frills or wave formation, the flow velocity v of the medium 101 can be determined from the diagonally radiated transmission signal, which is reflected on the surface of the medium 101, and the flow rate of the second radar sensor 202, taking into account the Doppler effect. The first transmission signal 102 emitted perpendicular to the surface of the medium 101 can be used after its reflection on the surface of the medium 101 and detection by the first radar sensor 201 for distance measurement.

Various radar methods can be used to measure the flow velocity v of medium 101. A common radar procedure is the CW radar process (continuous wave). In this case, an unmodulated sinus signal is transmitted and received by the second radar sensor 202, which is aligned diagonally in reference to the surface of the medium 101. Through wave movements and moving particles on or near the surface, the reflected signal is charged with a Doppler, that is, a frequency shift proportional to the speed of the reflection site, which is evaluated by the radar measuring device 100. With a CW radar, Doppler frequencies can be measured and dissolved very precisely.

The Doppler spectrum created here includes speed components of all objects located in a visual area B of the second radar sensor 202, which in particular in the case of difficult measuring conditions, e.g. rain or leaves in the visual area B of the radar sensor 202, leads to problems. An absolute distance measurement is not possible with the CW radar method.

As an alternative, the FMCW radar process is known in the prior art. In this process, a high-frequency sinus signal is continuously modified in its frequency f, which corresponds in the frequency-time diagram to a ramp or a sawtooth signal. This method has the advantage, in addition to the position of a reflector, that is, the distance of the object to the radar sensor, to also measure the Doppler shift generated by the object and thus its speed. If several moving objects are located in the visual area B of the second radar sensor 202, then the Doppler effects of the moving objects are overlaid, so that there is unambiguity in the signal evaluation.

FIG. 2a shows a simplified illustration of the radar meter 100 of FIG. 1, with here a second radar sensor 202 being shown for better clarity. The radar meter 100 radiates the second transmission signal 103 in the direction of the second main direction of emission H2. For clarification, a radiation cone of the radar meter 100 is drawn, which shows the tapered extension of the second transmission signal 103 with increasing distance from the second radar sensor 202.

All radar-based methods for measuring Doppler frequencies can only record speed components parallel to the propagation direction of the electromagnetic waves, i.e. in the present case, essentially parallel to the second main direction of emission H2 of the radar meter 100. Rain therefore has a relatively broad Doppler spectrum. Due to the angle between the main emission direction H2 of the radar meter 100 in relation to a drop direction of rain, many different speeds can arise even with a constant drop speed in the water drops. The speeds resulting from this can lie in the same magnitude as the flow speed of medium 101 in the channel 104 and overlaid with them in a disadvantageous fashion. Raindrops also generate negative and positive speeds, since they travel past the radar meter 100, first falling towards it and then moving away from it. This effect is still reinforced by the secondary lobe of a real antenna of a radar meter 100.

If the radar meter 100 is used with a measuring method according to the prior art, then in an already idealized illustration all objects present in the visual field B, which is limited by the two parallel lines and the radiation cone of the radar sensor 202, represent objects which are taken into consideration by the second radar sensor 202 for a measurement. Therefore, when i.e., it rains and wind accelerates it in the direction of the flow direction F of the medium 101, and/or loose leaves are blown about, all speed proportions are taken into account parallel in reference to the main emission direction H2 in the Doppler spectrum, and overlaid. A measurement of the flow velocity v can thus be prevented.

FIG. 2b shows the transmission signal 103 of a FMCW procedure, here the frequency F is displayed over time t. The transmission signal 103 is changed from a start frequency f1 to a stop frequency f2 during a measurement period T.

FIGS. 3a and 3b show a measurement curve that is available according to the method from the prior art, that is the Doppler spectrum in good measuring conditions (FIG. 3a) and when it rains (FIG. 3b).

To calculate the mean flow velocity v, the focus is respectively determined on the measurement curve from FIG. 3a and FIG. 3b. This depends largely on how strongly the spectrum is influenced by disturbances. Under certain circumstances, the focus can even lie in the negative partial space of the spectrum, which would mean a change in direction of the flow rate v.

In the process known from the prior art, it is therefore considered disadvantageous that disturbances such as rain or leaves blown about by wind can significantly distort the measurement and all moving objects in the visual area B of the radar sensor can create Doppler frequencies, which are additionally included in the flow velocity v.

The objective of the present invention is to further improve a method for measuring the flow velocity of a medium in an open channel such that the negative effects known from the prior art are reduced or entirely avoided.

This objective is attained in a method showing the features as described herein. Advantageous further developments are the objective of the dependent claims.

BRIEF SUMMARY OF THE INVENTION

In a preferred embodiment, a method for measuring the flow velocity (v) of a medium (101) in an open channel (104) with a radar meter (100),
wherein the radar meter (100) is arranged and aligned in such a way that a primary emission direction (H1) of the radar instrument (100) forms with a direction of a surface normal of the medium (101) a first angle (a) between 20° and 80°, preferably between 30° and 60°, and with a flow direction (F) of the medium (101) a second angle (β) between 0° and 80°, preferably between 0° and 60°, comprising the following steps:
Sending a transmission signal (105) with a plurality of frequency ramps (501-504),
Receiving a reception signal per frequency ramp (501-504) of the transmission signal (105),
Saving the reception signals,
Performing a first spectral analysis of the reception signals,
Performing a second spectral analysis of several receiving signals or output signals of the first spectral analysis,
Determining a flow velocity (v) based on the phase change using the output signals of the second spectral analysis in at least one distance in the distance range (II).

In another preferred embodiment, the method as described herein, characterized in that the flow rate (v) is determined based on an average phase change in the distance range (II).

In another preferred embodiment, the method as described herein, characterized in that a level of the medium (101) is determined in the channel (104).

In another preferred embodiment, the method as described herein, characterized in that the distance range (II) is adjusted based on the determined level.

In another preferred embodiment, the method as described herein, characterized in that the spectral analysis is a fast Fourier transformation (FFT).

In another preferred embodiment, the method as described herein, characterized in that a transmission signal (102) with at least 25, preferably at least 50, more preferably a few hundred frequency ramps is transmitted.

In another preferred embodiment, the method as described herein, characterized in that the transmission portal (102) comprises a number of $2^n$ frequency ramps.

In another preferred embodiment, the method as described herein, characterized in that the transmission signal (102) shows 128, 256 or 512 frequency ramps.

In another preferred embodiment, the method as described herein, characterized in that a frequency ramp has a duration between 1 µs and 1000 µs, preferably between 50 µs and 300 µs, in particular 100 µs or 200 µs.

In another preferred embodiment, the method as described herein, characterized in that a start frequency f1 and/or a slope and/or an increment of the frequency ramps varies.

In another preferred embodiment, the method as described herein, characterized in that the first angle (α) is determined by a position sensor.

DETAILED DESCRIPTION OF THE INVENTION

Figure 1:
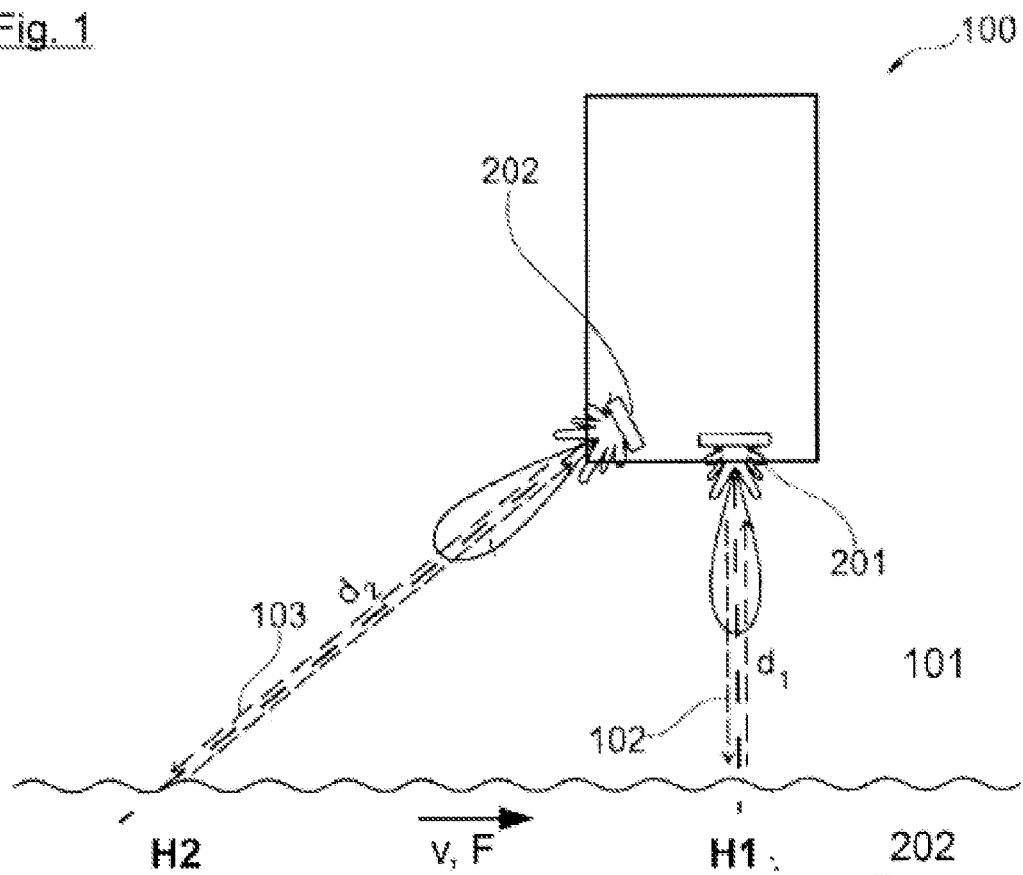
FIG. 1 is a line drawing evidencing a simplified depiction of a radar meter for determining a flow velocity and a level of a medium in an open channel.

The invention is a method for measuring the flow velocity of a medium in an open channel using a radar meter, wherein the radar meter is arranged and aligned such that a main direction of emission of the radar meter forms with a direction of a surface normal of the medium a first angle from 20° to 80°, preferably from 30° to 60°, and with a flow direction of the medium a second angle from 0° to 80°, preferably from 0° to 60°, comprising the following steps:

Emitting a transmission as a plurality of frequency ramps,
Receiving a reception signal per frequency ramp of the transmission,
Saving the reception signals,
Performing a first spectral analysis of the reception signals,
Performing a second spectral analysis of several output signals of the first spectral analysis in at least one specified distance from the radar meter,
Determining a flow rate based on the phase change using the output signals of the second spectral analysis.

For each measurement, the transmission signal has a plurality of frequency ramps. For such frequency ramps, which are also referred to as chirps, the transmission signal runs at a ramp duration from a few microseconds to a few hundred microseconds, for example, 100 µs or 200 µs, at a frequency range of some GHz, e.g. 5H GHz or 10 GHz, preferably at a frequency range between 75 GHz and 85 GHz. The frequency ramps can be continuously cycled through, so that a continuous change in the frequency or in a fine hatching may occur, e.g. in 5 Hz steps, comprising discrete frequency values within the frequency range.

Receiving signals are received and, for example, stored in an intermediate memory, whereby one receiving signal is obtained per frequency ramp.

The receiving signals are transferred with a first spectral analysis from the time range to the frequency range, whereby a frequency shift of the receiving signal relative to the transmission signal is proportional to a distance of the reflection to the transmitter, i.e., the fill gauge, so that in general reflections and their distance from the fill gauge, in the present case therefore e.g., the distance of the surface of the medium in the channel from the fill gauge can be determined from the signal obtained. With consideration of the first angle and the second angle, here generally a level of the medium in the channel can also be determined.

Through the second spectral analysis, which is carried out at least at the location, i.e. the frequency of reflection via the output signals of the first spectral analysis, a dependent phase of the signal is determined based on the speed of the reflection, i.e. a speed indicating a velocity of motion at the point where the medium moves causing the reflection. From the change in the phase over the individual reception signals, a speed distribution can be determined at the location of the reflection and thus in the area of the surface of the medium flowing in the channel.

For this purpose, the second spectral analysis can be limited to a distance in which the surface of the medium lies in the channel, i.e. only signal components are used for determining the flow velocity which actually represent a speed of the medium.

The first angle α is measured in the present application in a lateral view, perpendicular to the plane defined by the surface normal and the second main direction of emission, the second angle in a plan view from the top, i.e. with a view towards the surface normal.

It is noted at this point that the first and second spectral analysis can also be carried out in reverse order.

In order to make the measurement independent of any individual, locally elevated measured values, the flow rate can be determined based on an average phase change in a distance range. For this, the second spectral analysis is evaluated in the entire distance range, which means an average phase change and correspondingly an average speed can be determined in the distance range.

At this point, it is noted that the distance range is dependent on the diagonal irradiation of the measurement signals relative to the surface of the medium, i.e. the first and second angle. In determining the flow rate, therefore, the first angle and additionally the second angle, which describes the alignment of the radar meter relative to the flow direction, must be taken into consideration. The distance range, i.e., a range with intervals from a minimum distance up to a maximum distance, will show an elliptic shape on a planar surface in the main direction of radiation with a conical emission characteristic. If the surface of the medium is not in the channel, then this form is adapted accordingly.

The determination of the flow rate can occur, for example, at a distance or distance range specified in the main emission direction from the radar meter, in which the surface of the medium is expected. However, if the determination of the flow rate is to be done with a higher accuracy or if a fluctuating level is to be expected, then first a level measurement may occur for determining the distance or distance range in which the surface of the medium is given, thus the distance in which the flow rate is to be determined. The distance or distance range can then be adjusted based on the level measurement.

The level measurement can generally take place with the same radar meter, with which the flow rate is also determined. Due to the diagonal alignment of this radar meter relative to the surface of the medium, a level measurement error can become quite major, particularly in case of unfavorable measurement conditions, which can be caused by environmental influences, such that a level measurement with an independent measurement, in particular a second radar sensor, is to be preferred perpendicular to the surface of the medium. The level measurement value can then be used for determining the distance or distance range.

The term level measurement, in the present application, is understood both as a determination of the distance of the measuring instrument from the surface of the medium and a measurement of the distance of the surface of the medium from the base of the channel. In the present measuring arrangement, these values can each be converted to each other, so that the level can be determined from the level of the distance of the measuring device from the surface of the medium, and from the distance of the measuring device from the surface of the medium.

In this way, the distance range can be adjusted based on the determined level.

As a method for the first and/or second spectral analysis, a fast Fourier transformation (FFT) can be used for example. The fast Fourier transformation is a widely used and effective method in signal processing for transmitting signals between the time and frequency range.

The emitted signal preferably comprises at least 25, further preferably at least 50, and ideally a few hundred frequency ramps which are transmitted.

The number of frequency ramps, which are included in a transmission signal, specifies the number of possible receiving signals. This number determines a maximum possible temporal resolution for the emitted signal of the second spectral analysis, so that the number of signal points is also associated with the determination of the phase change and thus the flow rate.

In the practical implementation of the method, the transmission signal shows a number of $2^{nd}$ frequency ramps, wherein the transmission signal typically contains 128, 256 or 512 frequency ramps. A corresponding number of frequency ramps offers a sufficiently fine resolution for applications to measure a flow rate of media in channels, so that all relevant speeds can be recorded.

A frequency ramp can have a duration between 1 µs and 1,000 µs. Typically, the duration of the frequency ramps ranges from 50 µs to 300 µs and, in particular, amounts to 100 µs or 200 µs.

The steeper the frequency ramps, i.e., the shorter the duration of the frequency ramp relative to a frequency stroke, i.e. the distance of a lower limit frequency is to an upper limit frequency of the frequency ramp, the greater the frequency shift of the receiving signal relative to the transmission signal. Consequently, steeper frequency ramps are preferred, since commercially available evaluation circuits which show increasingly smaller geometric dimensions are designed rather for the processing of high frequencies.

To exclude measurement errors, a start frequency and/or a slope and/or an increment and/or an end frequency of the frequency ramps can be varied.

Through a variation of the parameters of the method, e.g., the number of frequency ramps, the start frequency, the target frequency, the sweep period, or the break time between the frequency ramps in a transmission signal, here disturbances, e.g., by other transmitters, can be minimized and an analysis can be dynamically altered and optimized. For example, corresponding changes can be made depending on the speeds of the reflections observed so far, so that, for example, with regard to the speed analysis the resolution can be increased or decreased by adjusting the number of frequency ramps.

For example, the first angle can be determined using a position sensor.

DETAILED DESCRIPTION OF THE FIGURES

In the following figures, unless stipulated otherwise, identical reference characters mark identical components with the same function.

Figure 2A:
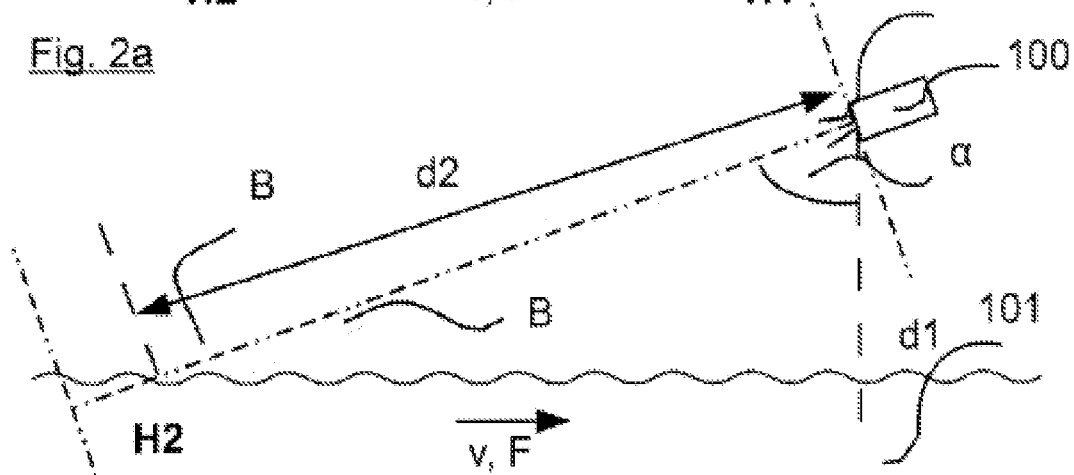
FIG. 2a is a line drawing evidencing a simplified depiction of the second radar sensor from FIG. 1 when using a measurement method according to the prior art.
Figure 2B:
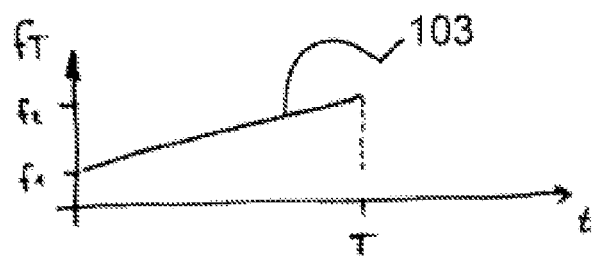
FIG. 2b is a line drawing evidencing a FMCW modulated transmission signal.
Figure 3A:
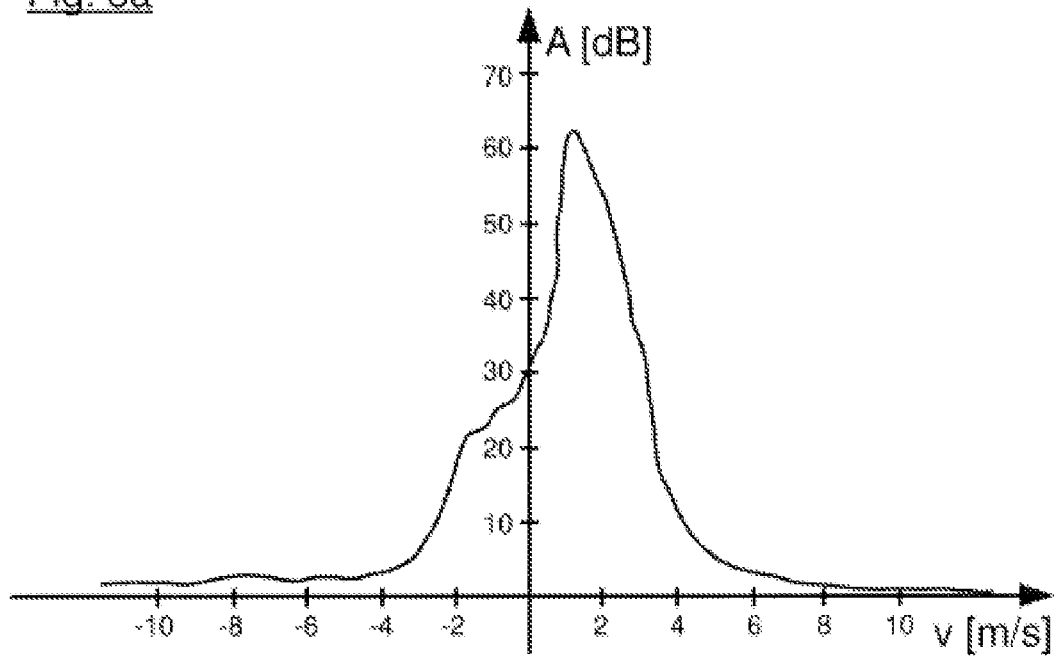
FIG. 3a is a line drawing evidencing a measurement curve, as it is obtained with the measurement method according to the prior art.
Figure 3B:
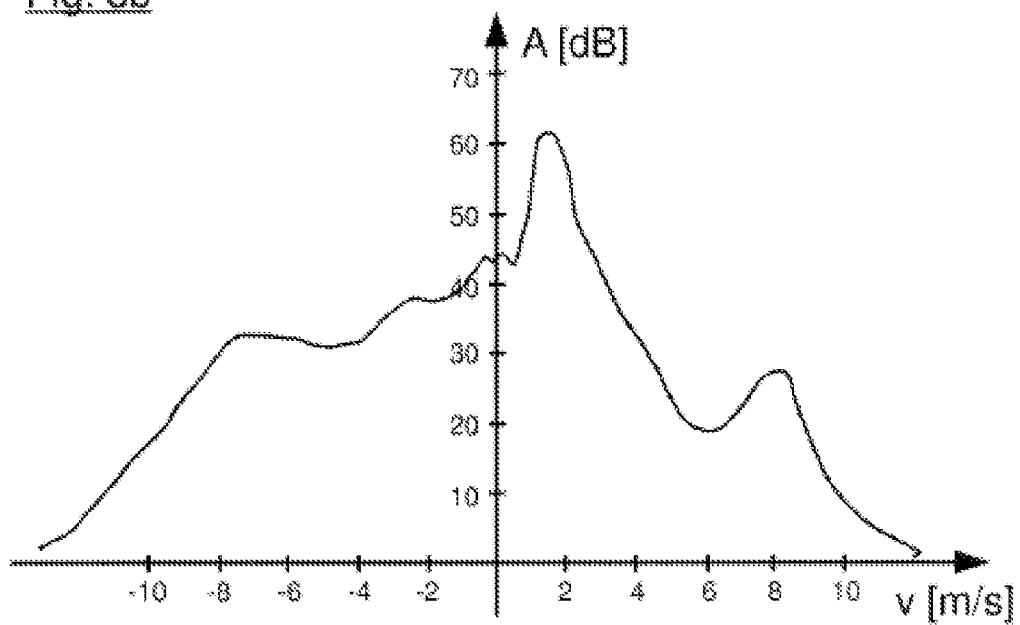
FIG. 3b is a line drawing evidencing the measurement curve according to FIG. 3a for rain.
Figure 4:
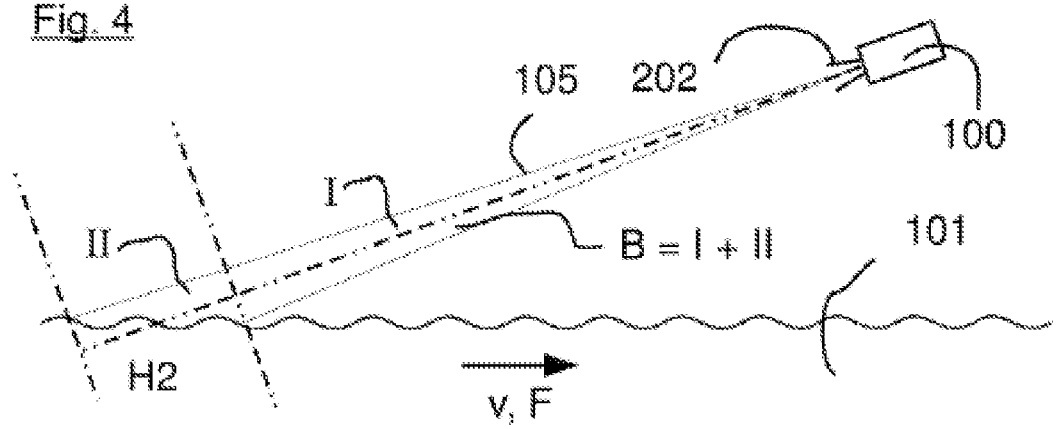
FIG. 4 is a line drawing evidencing a simplified representation of the second radar sensor from FIG. 1 when using the measurement method according to the present application.

FIG. 4 shows the illustration of the radar meter 100 from FIG. 2, wherein the measurement method is used according to the present application. In principle, radar meter 100 is constructed as described in connection with the prior art and FIGS. 1 and 2.

Through the present method, a visual area B of the radar meter 100 can be divided into a first area I, which is not considered for a measurement, and a second area II which is used for determining a flow velocity v of a medium 101.

Through the limitation of the range relevant for the measurement of the flow velocity v to the second area II, a significantly improved measurement result can also be achieved in the case of a variety of disturbances.

The procedure of the present application comprises the following steps:

Sending a transmission signal 105 with a plurality of frequency ramps,

Receiving a reception signal per frequency ramp of the transmission signal 105,

Saving the reception signals,

Performing a first spectral analysis of the reception signals,

Performing a second spectral analysis of several output signals of the first spectral analysis in a specified distance range from the radar meter 100, Determining at least one phase change between the receiving signals in at least one distance d2 in the distance range, Determining a flow velocity v based on the phase change.

Figure 5:
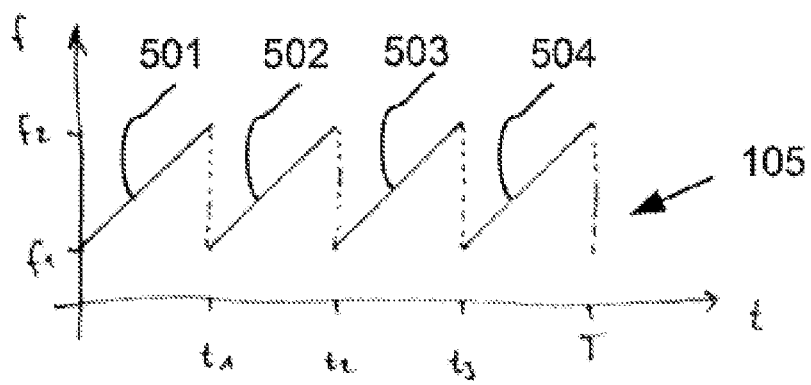
FIG. 5 is a line drawing evidencing the transmission signal of a method for measuring the flow velocity according to the present application.

FIG. 5 shows the transmission signal 105 of a method for fill level measurement according to the present application.

The transmission signal 105 is divided in this exemplary embodiment during a measurement cycle T in a period between t=0 and t=T into several frequency ramps 501, 502, 503, 504, within which a frequency f of the radiated radar signal is respectively modulated linearly from a start frequency f1 towards a target frequency f2. These individual frequency ramps are also called chirps. In contrast to the previously used modulation forms from the prior art, a pre-defined number of individual frequency ramps 501-504 with defined time behavior and defined frequency behavior in the direction of medium 101 is radiated and received again during a measurement cycle T between t=0 and t=T.

Defined time behavior is here understood as a pre-known and precisely implemented timing of start and stop times for each frequency ramp 501-504 and the breaks between frequency ramps 501-504. A defined frequency behavior refers to the exact compliance with start frequency f1 and stop frequency f2 and the slope of the respective frequency ramp.

In FIG. 5, only four frequency ramps 501-504 are shown for better clarity. In an actual implementation of the present method, at least several dozen, preferably several hundred such frequency ramps 501-504 are emitted. The number of frequency ramps 501-504 is often a dual potency, in particular 128, 256, 512 or 1024. Higher or lower potencies can also be used depending on the respective application.

Figure 6A:
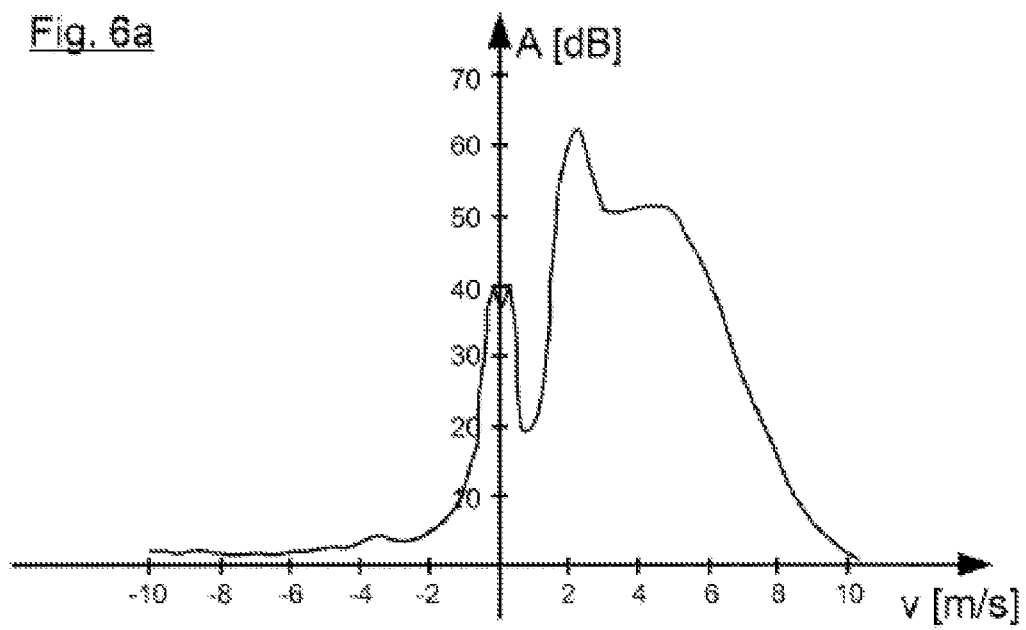
FIG. 6a is a line drawing evidencing a measurement curve, as it is received with the measurement method according to the present application.
Figure 6B:
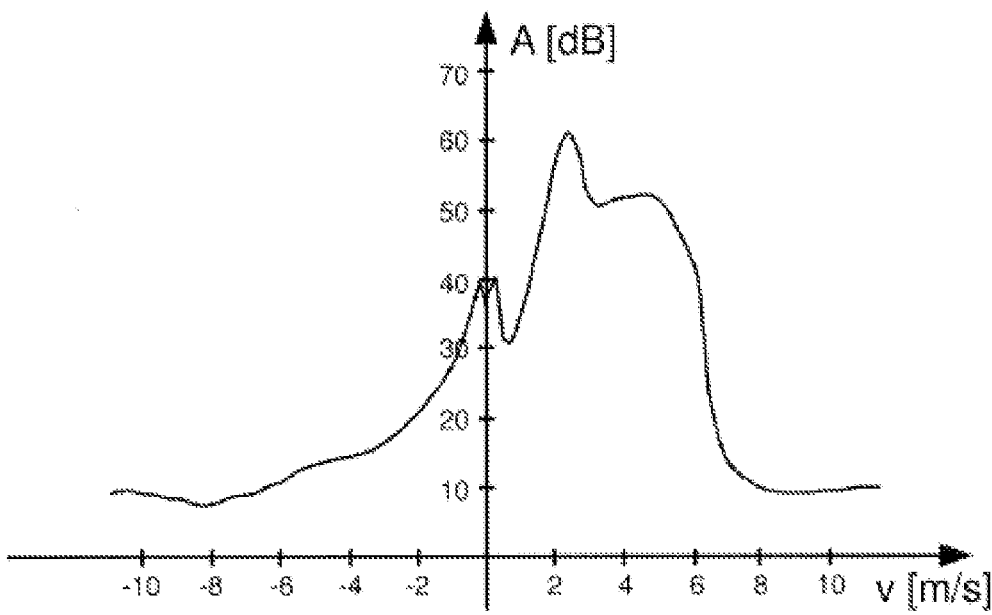
FIG. 6b is a line drawing evidencing the measurement curve according to FIG. 5a for rain.

FIGS. 6a and 6b show measurement curves, as they are received with the measuring method according to the present application, with good measurement conditions (FIG. 6a) and in rain (FIG. 6b). The amplitude A is shown in decibels of the received signals over the flow velocity v in meters per second.

From a comparison of FIGS. 6a and 6b it is discernible that the measurement result is significantly less distorted by the disturbances, so that the determination of the flow velocity v is significantly more reliable.

Figure 7:
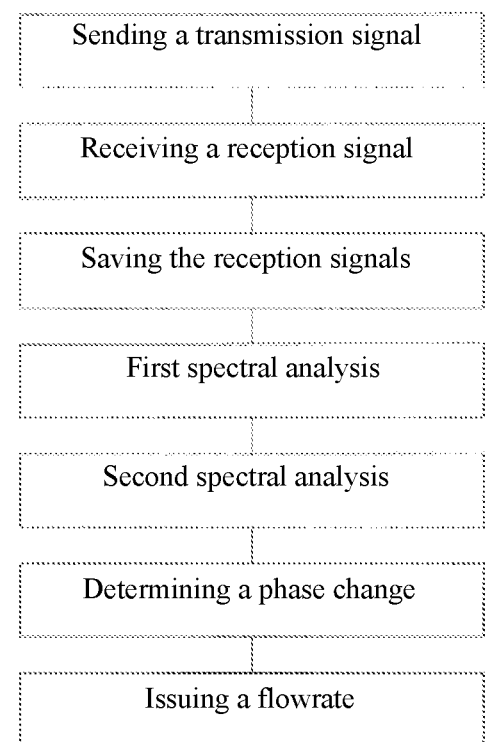
FIG. 7 is a flow chart evidencing the sequence of the method for measuring flow velocity according to the present invention.

FIG. 7 shows a sequence of the method of the present application in a flow chart.

In a first step, a transmission signal 105 is emitted with a plurality of frequency ramps 501-504. The transmission signal 105 is reflected on the surface of the medium 101 in the open channel 104 and, one receiving signal per frequency ramp 501-504 in the transmission signal 105 is reflected to the radar meter 100.

The receiving signals are received and stored by the radar meter 100.

The receiving signals are then subjected to a first spectral analysis, in the present case subjected to a fast Fourier transformation. From the signals obtained from this, a distance of a reflector on which the transmission signal was reflected to the radar meter 100 can be determined. This distance is the second distance d2 in the present application. From the second distance d2, in knowledge of the alignment of the radar meter to the surface of the medium, a vertical distance of the radar meter to the surface of the medium can be determined, i.e. the first distance d1. The first distance d1 can be converted into a level of medium 101 in the channel 104.

Then a second spectral analysis of several output signals of the first spectral analysis is carried out in a specified distance range to the radar measuring device. The distance range can be specified or determined by a level measurement. Ideally, the distance range is selected in such a way that only one area of the surface is captured.

From the results of the second spectral analysis, a change in the phase between the receiving signals is determined in at least one distance in the distance range. This change in the phase is proportional to a speed of the reflectors in the distance, so that the flow velocity v can be determined based on the change in the phase.

Finally, the flow velocity v is displayed and/or processed further.

LIST OF REFERENCE NUMERALS

100 Radar meter
101 Medium
102 First transmission signal
103 Second transmission signal
104 Channel
105 Transmission signal
201 First radar sensor
202 Second radar sensor
501-504 Frequency ramp
α First angle
β Second angle
I First area
II Second area, distance range
A Amplitude
B Visual area
d1 First distance
d2 Second distance
F Flow direction
f Frequency
f1 Start frequency
f2 Stop frequency
H1 First main emission direction
H2 Second main emission direction
t Time
T Measurement period, period duration

We claim:

1. A method for measuring the flow velocity of a medium in an open channel with a radar meter, wherein the radar meter is arranged and aligned in such a way that a primary emission direction of the radar meter forms with a direction of a surface normal of the medium a first angle between 20° and 80°, and with a flow direction of the medium a second angle between 0° and 80°, comprising the following steps:
   Sending a transmission signal with a plurality of frequency ramps,
   Receiving a reception signal per frequency ramp of the transmission signal,
   Saving the reception signals,
   Performing a first spectral analysis of the reception signals,
   Performing a second spectral analysis of several receiving signals or output signals of the first spectral analysis,
   Determining a flow velocity based on a phase change using the output signals of the second spectral analysis in at least one distance in a distance range, such distance range comprising a range from a minimum distance up to a maximum distance resulting on account of a distance of the surface of the medium from the radar meter in a main emission direction and the first angle and second angle, wherein the flow velocity is determined on account of an average phase change in the distance range, a level of the medium in the channel is determined, and the distance range is adjusted based on the determined level.

2. The method of claim 1, wherein the spectral analysis is a fast Fourier transformation.

3. The method of claim 1, wherein a transmission signal with at least 25 frequency ramps is transmitted.

4. The method of claim 1, wherein a transmission portal comprises a plurality of frequency ramps.

5. The method of claim 4, wherein the transmission signal contains 128, 256 or 512 frequency ramps.

6. The method of claim 1, wherein a frequency ramp has a duration between 1 μs and 1000 μs.

7. The method of claim 1, wherein a start frequency f1 and/or a slope and/or an increment of the frequency ramps varies.

8. The method of claim 1, wherein the first angle is determined by a position sensor.

9. The method of claim 1, wherein a transmission signal with at least 300 frequency ramps is transmitted.

10. The method of claim 1, wherein a frequency ramp has a duration of between 100 μs and 200 μs.

\* \* \* \* \*